US012548625B2

(12) United States Patent
Li et al.

(10) Patent No.: US 12,548,625 B2
(45) Date of Patent: Feb. 10, 2026

(54) MEMORY DEVICE TO PROGRAM MULTIPLE BIT LINES USING A SINGLE WORD LINE PROGRAMMING PULSE

(71) Applicant: YANGTZE MEMORY TECHNOLOGIES CO., LTD., Wuhan (CN)

(72) Inventors: Chenhui Li, Wuhan (CN); Xiangnan Zhao, Wuhan (CN); Hongtao Liu, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 119 days.

(21) Appl. No.: 18/470,922

(22) Filed: Sep. 20, 2023

(65) Prior Publication Data

US 2025/0006268 A1   Jan. 2, 2025

(30) Foreign Application Priority Data

Jun. 30, 2023  (CN) .................. 202310804109.X

(51) Int. Cl.
*G11C 16/10* (2006.01)
*G11C 11/56* (2006.01)
(Continued)

(52) U.S. Cl.
CPC ........ *G11C 16/102* (2013.01); *G11C 11/5628* (2013.01); *G11C 16/0483* (2013.01);
(Continued)

(58) Field of Classification Search
CPC .............. G11C 16/102; G11C 11/5628; G11C 16/0483; G11C 16/08; G11C 16/10;
(Continued)

(56) References Cited

U.S. PATENT DOCUMENTS

| | | | |
|---|---|---|---|
| 2015/0070987 A1* | 3/2015 | Kim ................... | G11C 16/3459 |
| | | | 365/185.03 |
| 2019/0164618 A1* | 5/2019 | Yun ....................... | G11C 16/08 |

(Continued)

FOREIGN PATENT DOCUMENTS

| CN | 106157999 A | 11/2016 |
|---|---|---|
| CN | 111386573 A | 7/2020 |
| CN | 115019861 A | 9/2022 |

OTHER PUBLICATIONS

Yangtze Memory Technologies Co., Ltd., "First Examination Opinion Notice," Date of Publication: Sep. 10, 2025, 11 p. (translation 11 p.).

*Primary Examiner* — Donald HB Braswell
(74) *Attorney, Agent, or Firm* — Conley Rose, P.C.

(57) ABSTRACT

The present disclosure provides a method of operating a memory, a memory, a memory system and an electronic device. In an example, a method of operating a memory is provided. The memory includes multiple word lines, and each of the plurality of word lines is coupled to a plurality of memory cells. The method includes: performing a first programming operation on a plurality of memory cells coupled to a selected word line among the multiple word lines, the first programming operation including applying a one-pulse to the selected word line to program the multiple memory cells coupled to the selected word line into N programmed states; and performing a second programming operation on the selected word line to program the multiple memory cells coupled to the selected word line into N target programmed states, where N is a positive integer.

20 Claims, 12 Drawing Sheets

(51) Int. Cl.
  *G11C 16/04* (2006.01)
  *G11C 16/08* (2006.01)
  *G11C 16/12* (2006.01)
  *G11C 16/24* (2006.01)
  *G11C 16/34* (2006.01)
(52) U.S. Cl.
  CPC .............. *G11C 16/08* (2013.01); *G11C 16/10* (2013.01); *G11C 16/12* (2013.01); *G11C 16/24* (2013.01); *G11C 16/34* (2013.01); *G11C 16/3459* (2013.01)
(58) Field of Classification Search
  CPC ......... G11C 16/12; G11C 16/24; G11C 16/34; G11C 16/3459; G11C 16/32
  See application file for complete search history.

(56) References Cited

U.S. PATENT DOCUMENTS

2019/0362799 A1* 11/2019 Yang ................ G11C 16/10
2024/0112737 A1*  4/2024 Verreck .............. G11C 16/16

* cited by examiner

MEMORY DEVICE TO PROGRAM MULTIPLE BIT LINES USING A SINGLE WORD LINE PROGRAMMING PULSE

CROSS-REFERENCE TO RELATED APPLICATIONS

The present application claims priority to Chinese Patent Application No. 202310804109X, which was filed Jun. 30, 2023, is titled "A Memory Operation Method, Memory, Storage System and Electronic Equipment," and is hereby incorporated herein by reference in its entirety.

TECHNICAL FIELD

Implementations of the present disclosure relate to the field of storage, and in particular, to a method of operating a memory, a memory, a memory system, and an electronic device.

BACKGROUND

With the continuous development of information technologies and the advent of the era of big data, NAND flash memory has gradually become the mainstream product of non-volatile memory by virtue of its advantages such as large capacity and low cost. By programming each memory cell in the NAND flash memory, the threshold voltage (Vth) of each memory cell is changed, so that the storage of information can be realized.

However, as the demand for storage capacity of NAND flash memory continues to increase, NAND flash memory continues to develop towards device size reduction and multi-value storage technology, causing initial threshold voltage shift (IVS) of each memory cell in NAND flash memory to become more severe. In other words, fast charge loss is more severe, which will lead to lower reliability of NAND flash memory.

SUMMARY

Implementations of the present disclosure provide a method of operating a memory, a memory, a memory system, and electronic device, which mitigate low reliability of NAND flash memory due to initial threshold voltage shift of memory cells.

In some examples, the implementations of the present disclosure adopt the following technical solutions.

In one aspect, a method of operating a memory is provided. The memory includes a plurality of word lines, and each of the plurality of the word lines coupled to a plurality of memory cells. The method includes: performing a first programming operation on a plurality of memory cells coupled to a selected word line of the plurality of word lines, the first programming operation including applying a one-pulse to the selected word line to program the plurality of memory cells coupled to the selected word line into N programmed states; and performing a second programming operation on the selected word line to program the plurality of memory cells coupled to the selected word line into N target programmed states, where N is a positive integer.

In the method of operating a memory according to an implementation of the present disclosure, a first programming operation is firstly performed on a selected word line among a plurality of word lines, and the first programming operation includes applying a one-pulse to the selected word line to program the plurality of memory cells in selected word line into N programmed states. Then, the second programming operation is performed on the selected word line, and the plurality of memory cells in the selected word line are programmed into N target programmed states, so that the problems can be solved that the threshold voltages of the plurality of memory cells in the selected word line shift down as a whole due to rapid charge loss and the threshold voltage distribution curves of the plurality of memory cells broaden. The reliability of the memory can thus be improved.

In some implementations, the first programming operation does not include a verify operation.

In the method of operating the memory according to the implementations of the present disclosure, the first programming operation does not include a verify operation, and when programming a plurality of memory cells in a selected word line, time can be saved and programming efficiency is improved compared to the incremental step pulse programming method.

In some implementations, the applying a one-pulse to the selected word line includes: applying a plurality of consecutive programming voltages to the selected word line.

In some implementations, the plurality of consecutive programming voltages increase sequentially, or decrease sequentially.

In some implementations, the number of the plurality of consecutive programming voltages is N.

In some implementations, the memory further includes a plurality of bit lines, and the first programming operation includes: applying a programming voltage to the selected word line, applying a first bit line voltage to selected bit lines among the plurality of bit lines, and applying a second bit line voltage to unselected bit lines among the plurality of bit lines, thereby programming the memory cells coupled to the selected bit line among the plurality of memory cells into the same programmed state, the first bit line voltage being lower than second bit line voltage.

In the method of operating the memory according to the implementations of the present disclosure, the first programming operation does not include a verify operation, and when programming a plurality of memory cells in a selected word line, time can be saved and programming efficiency is improved compared to the incremental step pulse programming method.

In some implementations, the performing a second programming operation on the selected word line includes: performing the second programming operation on the plurality of memory cells in the selected word line by adopting an incremental step pulse programming ISPP method.

In the method of operating the memory according to the implementations of the present disclosure, after the first programming operation, the second programming operation is performed on the selected word line, and a plurality of memory cells in the selected word line are programmed into N target programmed states, so that the problems can be solved that the threshold voltages of the plurality of memory cells in the selected word line shift down as a whole due to rapid charge loss and the threshold voltage distribution curves of the plurality of memory cells broaden. The reliability of the NAND flash memory can thus be improved.

In some implementations, the second programming operation includes a verify operation.

In the method of operating a memory provided by an implementation of the present disclosure, the second programming operation includes a verify operation. By performing the second programming operation on the selected word line, the plurality of memory cells in the selected word line are reprogrammed and verified, so that the memory cells in the selected word line may be more accurately programmed into the target programmed states. The problem that the threshold voltage of plurality of memory cells in the selected word line shifts down as a whole due to rapid charge loss and the problem that the broadening of the threshold voltage distribution curves of the plurality of memory cells may be solved, thereby improving the reliability of NAND flash memory.

In some implementations, a threshold voltage distribution range of the memory cell in the Nth programmed state after the first programming operation is greater than that of the memory cell in the Nth programmed state after the second programming operation.

In another aspect, a memory is provided. The memory includes a peripheral circuit, and a memory array coupled to the peripheral circuit. The memory array includes a plurality of word lines, and each of the plurality of word lines is coupled to a plurality of memory cells. The peripheral circuit is configured to perform a first programming operation on a plurality of memory cells coupled to a selected word line of the plurality of word lines, the first programming operation including applying a one-pulse to the selected word line to program the plurality of memory cells coupled to the selected word line into N programmed states, and to perform a second programming operation on the selected word line to program the plurality of memory cells coupled to the selected word line into N target programmed states, where N is a positive integer.

In some implementations, the first programming operation does not include a verify operation.

In some implementations, the peripheral circuit is configured to apply a plurality of consecutive programming voltages to the selected word line.

In some implementations, the plurality of consecutive programming voltages increase sequentially, or decrease sequentially.

In some implementations, the number of consecutive programming voltages is N.

In some implementations, the memory array further includes a plurality of bit lines. The peripheral circuit is configured to apply a programming voltage to the selected word line, apply a first bit line voltage to selected bit lines among the plurality of bit lines, and apply a second bit line voltage to unselected bit lines among the plurality of bit lines, thereby programming the memory cells coupled to the selected bit line among the plurality of memory cells into the same programmed state, the first bit line voltage being lower than second bit line voltage.

In some implementations, the peripheral circuit is configured to perform the second programming operation on the plurality of memory cells in the selected word line by adopting an incremental step pulse programming (ISPP) method.

In some implementations, the second programming operation includes a verify operation.

In some implementations, a threshold voltage distribution range of the memory cell in the Nth programmed state after the first programming operation is greater than that of the memory cell in the Nth programmed state after the second programming operation.

In yet another aspect, a memory system is provided. The memory system includes a controller and at least one memory coupled to the controller. The controller is configured to control reading and writing of the memory, and the memory includes the memory provided above.

In some implementations, a the first programming operation of the memory system does not comprise a verify operation.

In a further aspect, an electronic device is provided. The electronic device includes a processor, and a memory system coupled to the processor, where the memory system includes the memory system provided above.

Effects achieved by the memory, memory system and electronic device according to the above implementations of the present disclosure can refer to the effects of the method of operating the memory above, and will not be repeated herein.

BRIEF DESCRIPTION OF THE DRAWINGS

To explain the technical solutions in the present disclosure more clearly, the accompanying drawings used in describing some implementations of the present disclosure will be briefly introduced below. The accompanying drawings in the following description are merely figures of some implementations of the present disclosure. For those of ordinary skill in the art, other drawings can also be obtained based on these drawings. In addition, the drawings in the following description can be regarded as schematic diagrams, and are not limitations on the actual size of the product, the actual process of the method, the actual timing of signals, and the like involved in the implementations of the present disclosure.

DETAILED DESCRIPTION

Figure 1:
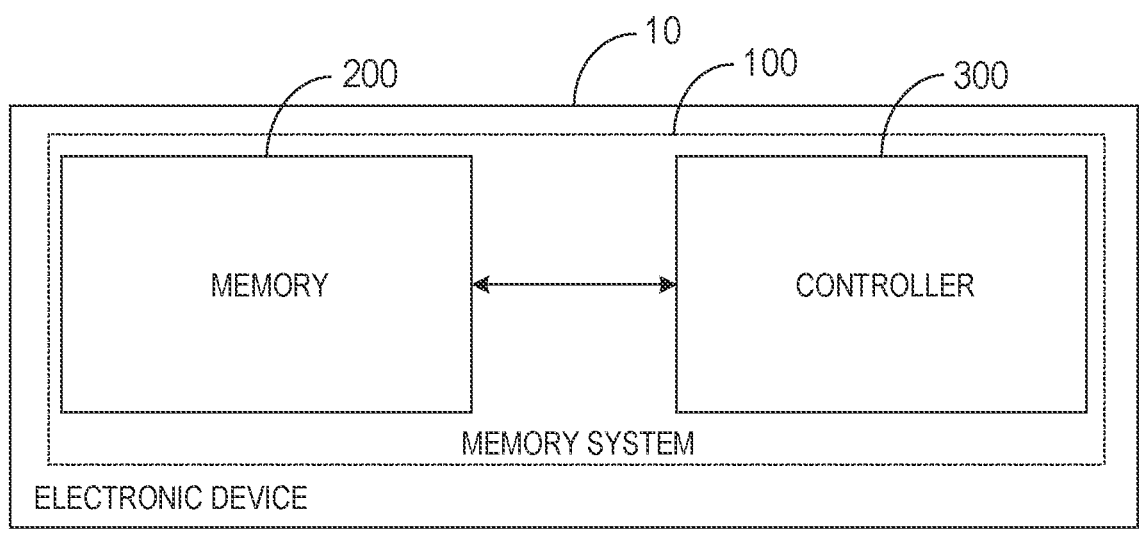
FIG. 1 is a schematic structural diagram of an electronic device according to some implementations.

The technical solutions in some implementations of the present disclosure will be clearly and completely described below in conjunction with the accompanying drawings. The described implementations are merely some of the implementations of the present disclosure, not all of them. All other implementations obtained by persons of ordinary skill in the art based on the implementations provided in the present disclosure fall within the protection scope of the present disclosure.

Throughout the specification and claims, the term "comprising" is interpreted in an open and inclusive sense, e.g., "including, but not limited to" unless required otherwise in the context. In the description of the specification, the terms "one implementation", "some implementations", "example implementation", "exemplarily" or "some examples", etc. are intended to indicate particular features, structures, materials or characteristics associated with the implementation or example are included in at least one implementation or example of the present disclosure. Schematic representations of the above terms are not necessarily referring to the same implementation or example. Furthermore, the particular features, structures, materials or characteristics described may be included in any suitable manner in any one or more implementations or examples.

Hereinafter, the terms "first" and "second" are used for descriptive purposes only, and shall not be understood as indicating or implying relative importance or implicitly specifying the quantity of indicated technical features. Thus, a feature defined by "first" and "second" may explicitly or implicitly include one or more of the features. In the description of the implementations of the present disclosure, "plurality" means two or more, unless otherwise specified.

In describing some implementations, the expressions such as "coupled" and "connected" and their derivatives may be used. For example, the term "connected" may be used in describing some implementations to indicate that two or more elements are in direct physical or electrical contact with each other. As another example, the term "coupled" may be used in describing some implementations to indicate that two or more elements are in direct physical or electrical contact. However, the term "coupled" may also mean that two or more elements are not in direct contact with each other, but still co-operate or interact with each other. The implementations disclosed herein are not necessarily limited by the contents herein.

"At least one of A, B and C" has the same meaning as "at least one of A, B or C" and both include the following combinations of A, B and C: A only, B only, C only, a combination of A and B, a combination of A and C, a combination of B and C, and a combination of A, B and C.

"A and/or B" includes the following three combinations: A only, B only, and a combination of A and B.

The use of "adapted to" or "configured to" herein means open and inclusive language that does not exclude devices that are adapted to or configured to perform additional tasks or steps.

Additionally, the use of "based on" is meant to be open and inclusive, as a process, step, calculation, or other action that is "based on" one or more stated conditions or values may in practice be based on additional conditions or beyond stated values.

Before introducing the implementations of the present disclosure, technical terms and related art involved in the present disclosure are introduced first.

The term "three-dimensional memory" refers to the semiconductor device formed by memory cell transistor strings (herein referred to as "memory cell strings", such as NAND memory cell string) arranged in an array on a main surface of a substrate or source layer and extending in a direction perpendicular to the substrate or source layer. As used herein, the term "perpendicular/perpendicularly" means nominally perpendicular to the main surface (e.g., lateral surface) of the substrate or source layer. The string address is an address corresponding to the "memory cell string". "The selected word line (WL)" is the word line corresponding to the word line address in the read request instruction, and the "unselected word line" is the word line other than the word line corresponding to word line address in the read request instruction.

Single level cell (SLC): each memory cell has only one storage bit and can only store one data item.

Multi level cell (MLC): each memory cell has two storage bits and can store two data items.

Triple level cell (TLC): each memory cell has three storage bits and can store three data items at the same time.

Quad level cell (QLC): each memory cell has four storage bits and can store four data items at the same time.

Rapid charge loss refers to the stability of the electrons captured by the shallow energy level trap after the memory cell is programmed, which is lower than the stability of the electrons captured by the deep energy level trap. Within a short time of the end of programming, the electrons captured by the shallow energy level trap are quickly released and returned to the channel, resulting in a shift down of the threshold voltage and a broadening of the threshold voltage distribution.

As shown in FIG. 1, a memory system 100 is generally provided in an electronic device 10. The memory system 100 includes a memory 200 and a controller 300. The controller 300 is coupled to the memory 200, and data can be read from the memory 200 or written into the memory 200 through the controller 300.

The memory system 100 may include the controller 300 and one or more memories 200. For example, in one implementation, the controller 300 and a single memory 200 may be integrated into a memory card. The memory card may include a Personal Computer Memory Card International Association (PCMCIA, PC) card, a compact flash card (CF card), a smart media card (SM card), a memory stick, a multimedia card (MMC), secure digital card (SD card), universal flash storage (UFS), etc. Among them, multimedia cards can be divided into MMC, reduced-size MMC (RS-MMC), mini MMC (MMCmicro), and so on; secure digital cards include SD, mini SD card (miniSD), micro SD card (microSD), secure digital high capacity card (SDHC), etc. Further, the memory card may further include a memory card connector for coupling the memory card with the host.

In another implementation, the controller 300 and the multiple memories 200 may be integrated into a solid state disk (SSD). The SSD may also include an SSD connector that couples the SSD to the host. In some implementations, the storage capacity and/or operating speed of the SSD is greater than the storage capacity and/or operating speed of the memory card. In addition, the above-mentioned electronic devices may be any of mobile phones, desktop computers, tablet computers, notebook computers, servers, vehicle-mounted devices, wearable devices (such as smart watches, smart bracelets, smart glasses, etc.), mobile power supplies, game consoles, digital multimedia players and the like, which is not limited by the implementations of the present disclosure.

Figure 2:
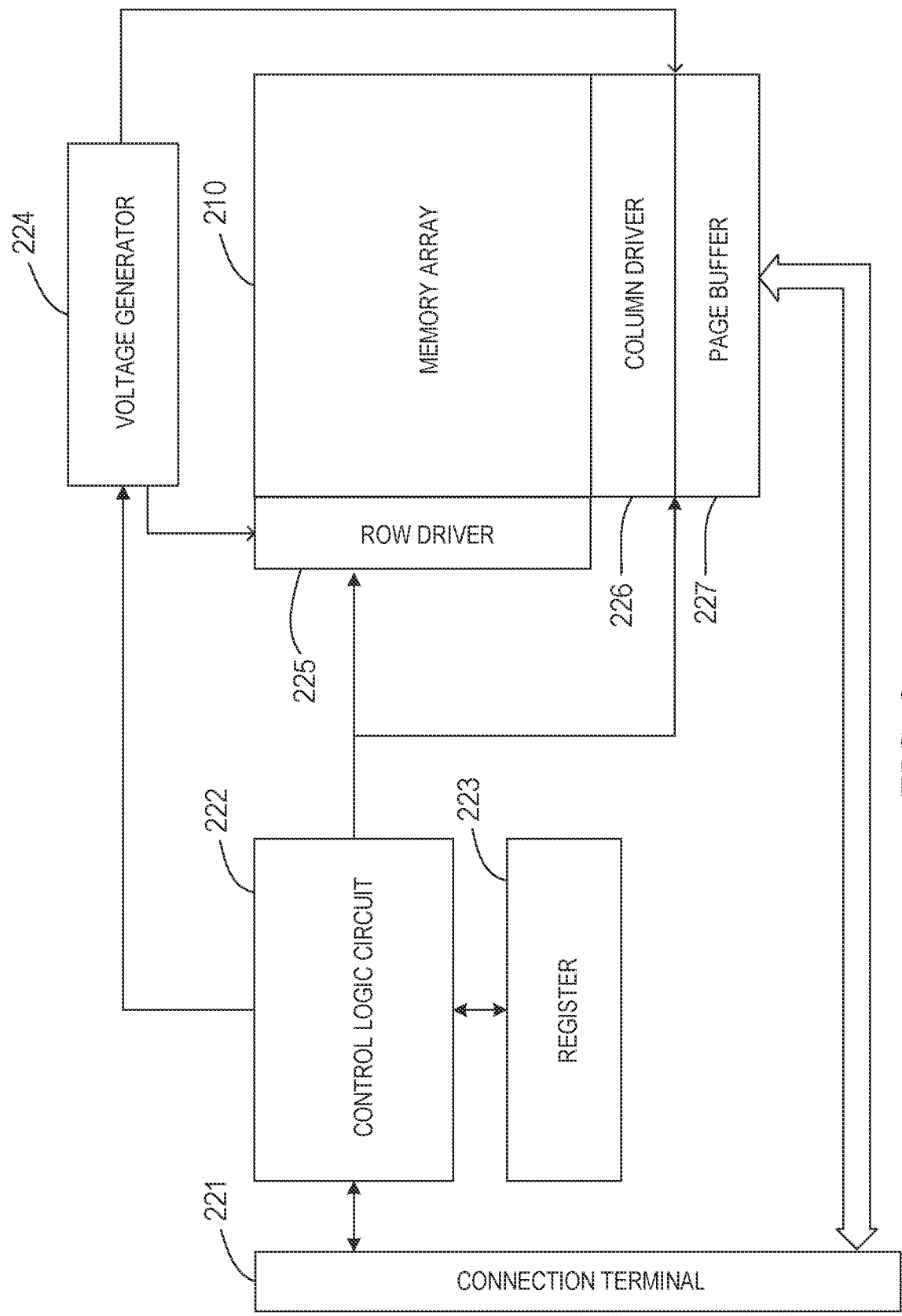
FIG. 2 is a schematic structural diagram of a memory according to some implementations.

As shown in FIG. 2, the memory 200 includes generally a memory array 210 and a peripheral circuit (not individually labeled). The peripheral circuit includes a connection terminal 221, a control logic circuit 222, a register 223, a voltage generator 224, a row driver 225, a column driver 226, page buffer 227 and so on.

The connection terminal 221 is configured to receive the reading instruction and writing instruction sent by the controller 300 and send the read data to the controller 300 and the like. The control logic circuit 222 is configured to control the row driver 225 to connect the voltage generator 224 to the corresponding word line according to the received read instructions, and to control the column driver 226 to connect the voltage generator 224 to the corresponding bit line (BL) to read the corresponding data. The register 223 includes an address register, a status register, and the like. Among them, the address register is configured to store a word line address, a string address and the like in the read request instruction. The status register is configured to store the current status of the memory, including two states of ready and busy. When the control logic circuit 222 is reading data from the memory array 210 or writing data to the memory array 210, the status stored in the status register is a "busy" status, and the next reading or writing operation cannot be performed. After the memory array 210 completes the reading or writing process, the status stored in the status register is switched to a "ready" status, and the next reading or writing operation can be performed. The page buffer 227 includes a first register and a second register. The first register is configured to buffer data read from the memory array 210, and the second register is configured to buffer data transferred from the first register.

Figure 3:
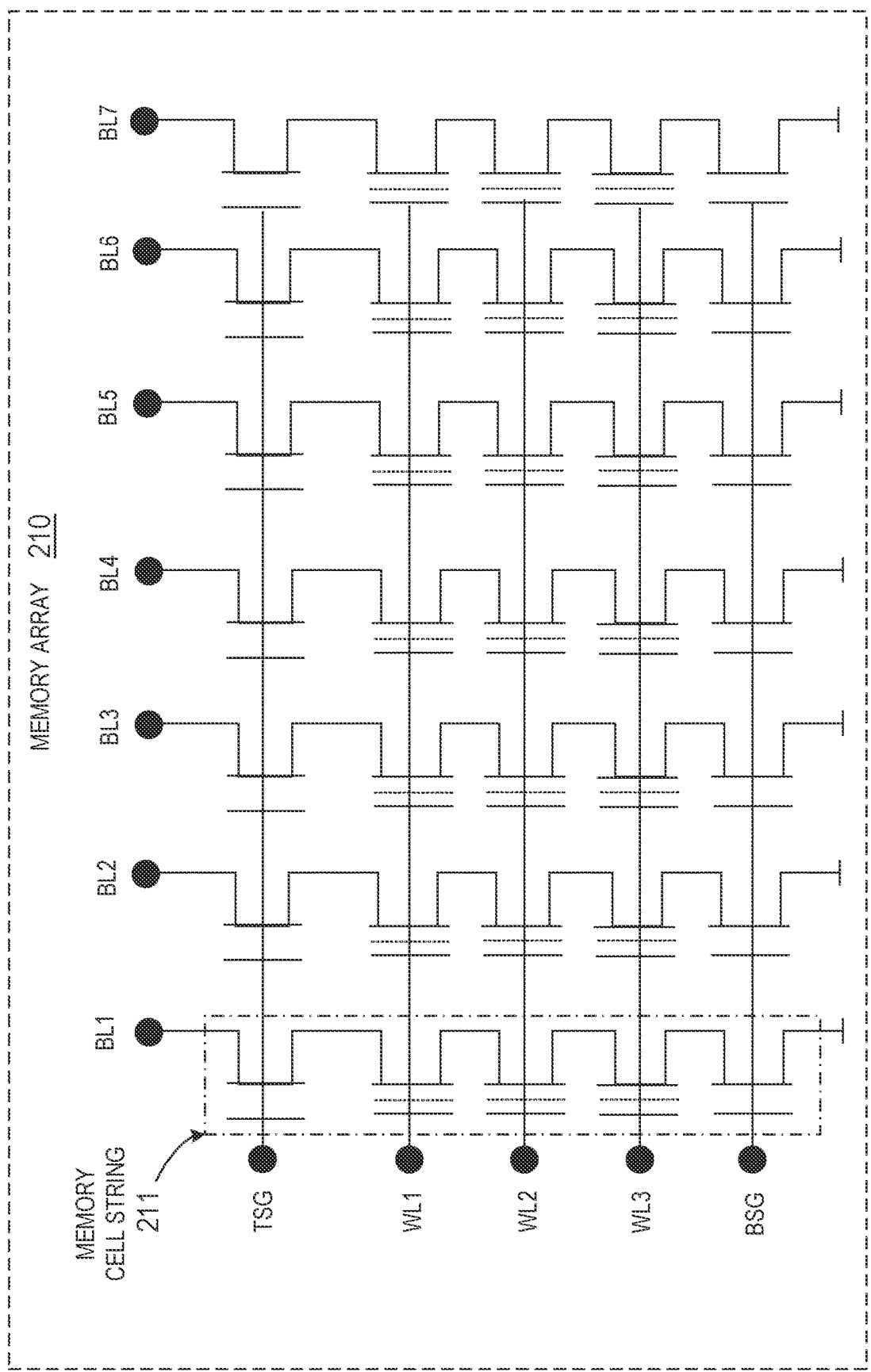
FIG. 3 is a schematic structural diagram of a memory array according to some implementations.

The memory array 210 in the memory 200 may include multiple memory cells arranged at intersections of word lines and bit lines. According to the difference in structure of the memory array 210, the memory can be divided into two-dimensional memory and three-dimensional memory. As shown in FIG. 3, a schematic structural diagram of a memory array 210 in a three-dimensional memory is illustrated. The memory array 210 includes word lines WL1-WL3 and bit lines BL1-BL7. The multiple memory cells on each bit line that are perpendicular to respective word lines make up a memory cell string 211. A top selective gate (TSG) is arranged at the top of each memory cell string 211, and a bottom selective gate (BSG) is arranged at the bottom of each memory cell string 211. Multiple memory cell strings 211 may be disposed on each bit line, and each word line may be coupled to memory cells in the multiple memory cell strings 211. The difference between a two-dimensional memory and a three-dimensional memory is that there is only one memory cell in the memory cell string 211 perpendicular to each bit line in the two-dimensional memory.

The smallest unit of programming in NAND flash memory is page. Taking a certain memory cell in a page as an example, when data is to be stored in the memory cell, the turn-on voltage can be input to the top selective transistor (TSG) and the bottom selective transistor (BSG) respectively, so that the top selective transistor and the bottom selective transistor are turned on. A programming voltage is then applied to the word line coupled to the memory cell, and a program enable voltage is applied to the bit line coupled to the memory cell, so that the threshold voltage (Vth) of the memory cell can be programmed to realize information storage. To read data from the memory cell, the turn-on voltage can be input to the top selective transistor and the bottom selective transistor respectively, so that the top selective transistor and the bottom selective transistor are turned on. A read voltage is then applied to the word line coupled to the memory cell, and a turn-on voltage is applied to the bit line coupled to the memory cell to realize information reading.

An increment step pulse program (ISPP) method may be used to program the NAND flash memory. In an example, taking a certain memory cell in a page of the NAND flash memory as an example, by applying a continuously increasing programming voltage to the word line coupled to the memory cell during programming, a turn-on voltage is applied to the bit line coupled to the memory cell to realize the programming of the memory cell.

Figure 4:
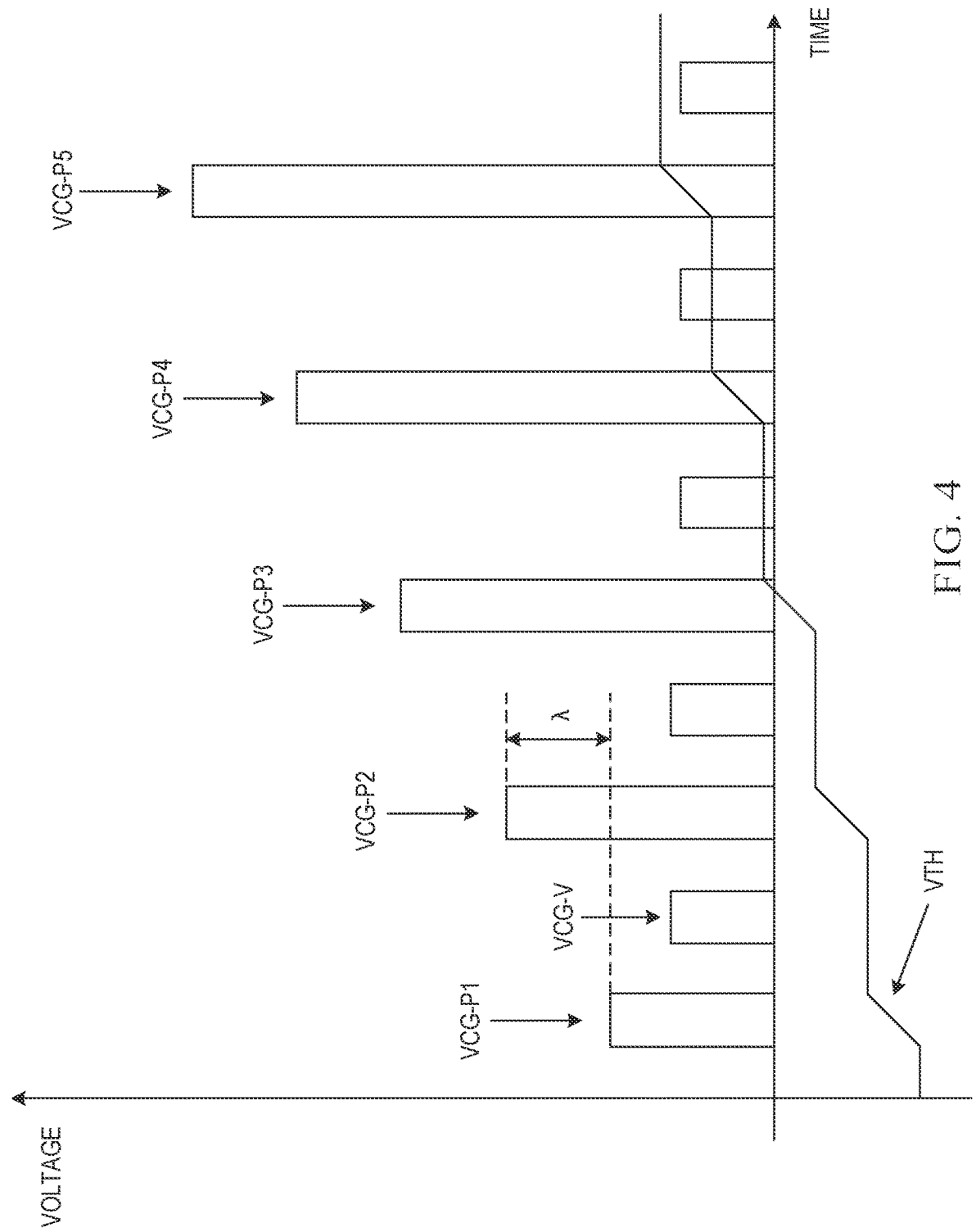
FIG. 4 is a schematic diagram illustrating a change in a voltage applied to a memory cell according to some implementations.

In an example, FIG. 4 is a schematic diagram of change in the voltage applied to a memory cell. Taking a certain memory cell in a page of NAND flash memory as an example, when programming starts, the first programming voltage Vcg-P1 can be applied to the word line coupled to the memory cell, the program enable voltage can be applied to the bit line coupled to the memory cell, and then programming verification voltage Vcg-V can be applied to the word line, thereby verifying whether the threshold voltage Vth of the memory cell reaches the target threshold. If the target threshold value is not reached, a second programming voltage Vcg-P2 is applied to the word line coupled to the memory cell, a program enable voltage is applied to the bit line coupled to the memory cell, and then the programming verification voltage Vcg-V is applied to the word line again, so as to verify whether the threshold voltage Vth of the memory cell reaches the target threshold, where the difference between the second programming voltage Vcg-P2 and the first programming voltage Vcg-P1 is $\lambda$. The above operations are repeated continuously. Vcg-P3 to Vcg-P5 and the like which increase by the programming voltage of $\lambda$ in sequence are applied to the word line coupled to the memory cell, so that the threshold voltage Vth of the memory cell is continuously increased. Verification is made after each application of the programming voltage, and programming of the memory cell is stopped until it is verified that threshold voltage Vth of the memory cell reaches the target threshold, thereby completing the programming of the memory cell, which can also be referred to as programming the memory cell to the target programmed state.

By adopting the above-mentioned incremental step pulse programming method, the memory cells in the NAND flash memory can be programmed into any one of multiple different programmed states. Based on the memory cells in the NAND flash memory, multi-value storage can be implemented.

In an example, a NAND flash memory includes multiple memory cells and the above-mentioned incremental step pulse programming method is used to program the multiple memory cells into multiple programmed states.

Figure 5A:
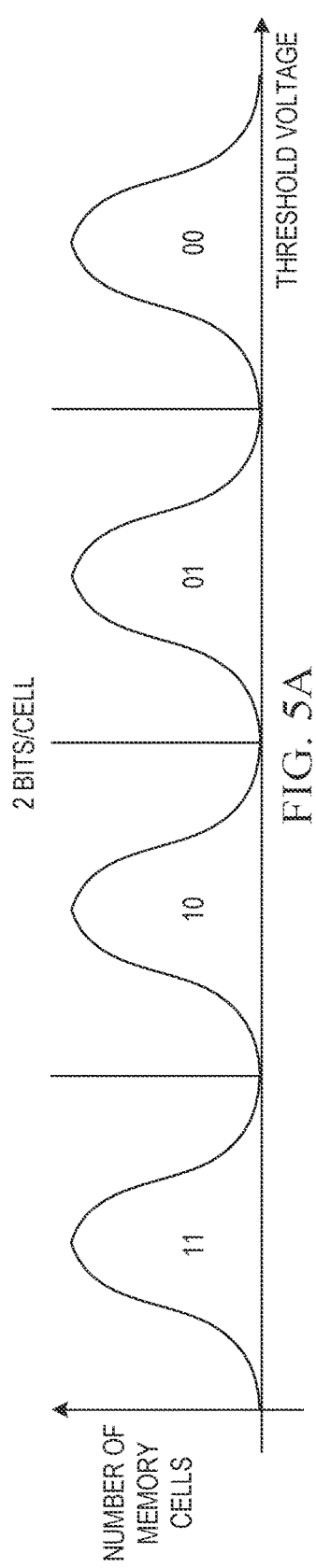
FIGS. 5A-5C are schematic diagrams of a threshold voltage distribution curve according to some implementations.

When the multiple memory cells are multi level cells (MLC), the amount of data stored in each memory cell is 2 bits per cell. After programming the multiple memory cells into multiple programmed states, the threshold voltage distribution of the multiple memory cells can be shown in FIG. 5A. At this time, the multiple memory cells are programmed into 4 programmed states, and the 4 programmed states are "11", "10", "01" and "00" respectively.

Figure 5B:
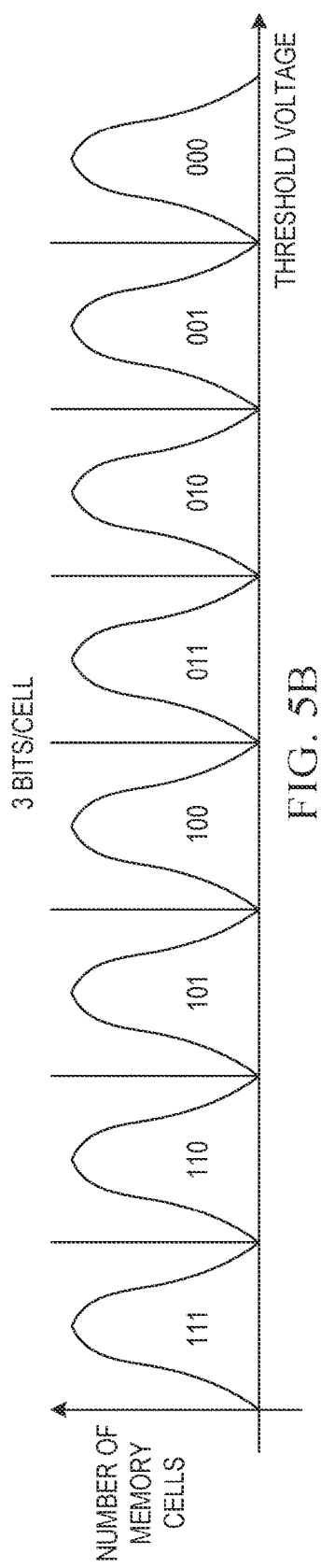

When the multiple memory cells are triple level cells (TLC), the amount of data stored in each memory cell is 3 bits per cell. After programming the multiple memory cells into multiple programmed states, the threshold voltage distribution of the multiple memory cells can be shown in FIG. 5B. At this time, the multiple memory cells are programmed into 8 programmed states, and the 8 programmed states are "111", "110", "101", "100", "011", "010", "001" and "000" respectively.

Figure 5C:
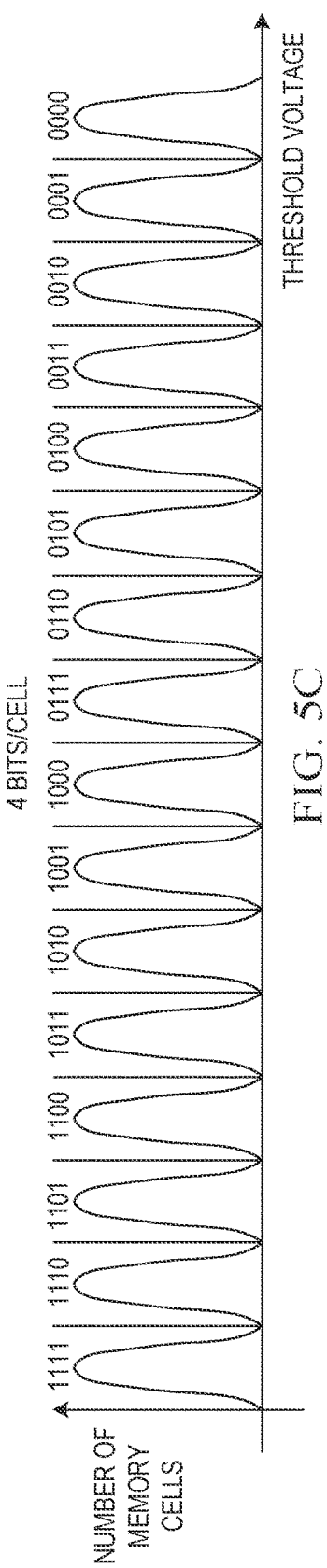

When the multiple memory cells are quad level cells (QLC), the amount of data stored in each memory cell is 4 bits per cell. After programming the multiple memory cells into multiple programmed states, the threshold voltage distribution of the multiple memory cells can be shown in FIG. 5C. At this time, the multiple memory cells are programmed into 16 programmed states, and the 16 programmed states are "1111", "1110", "1101", "1100", "1011", "1010", "1001", "1000", "0111", "0110", "0101", "0100", "0011", "0010", "0001" and "0000" respectively.

As the demand for storage capacity continues to increase, NAND flash memory continues to develop towards device size reduction and multi-value storage technology, which will lead to rapid charge loss of each memory cell in NAND flash memory becoming more severe, resulting in the lower reliability of NAND flash memory.

Figure 6A:
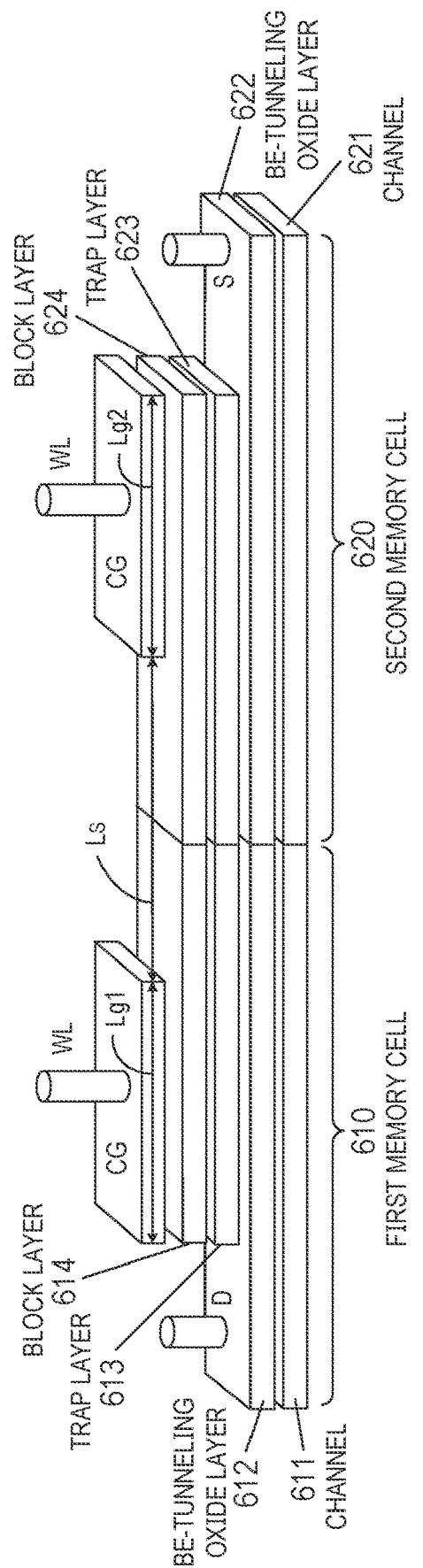
FIGS. 6A-6B are schematic structural diagrams of a memory cell according to some implementations.

In an example, as shown in FIG. 6A, taking the NAND flash memory including a first memory cell 610 and a second memory cell 620 as an example, the two memory cells each include a source (S), a drain (D) and a control gate (CG). The control gate is coupled to the word line (WL), and the source of the first memory cell 610 is coupled to the drain of the second memory cell 620. The first memory cell 610 further includes a channel 611, a BE-tunneling oxide layer 612, a trap layer 613 and a block layer 614. The second memory cell 620 further includes a channel 621 coupled to the channel 611, a BE-tunneling oxide layer 622 coupled to the BE-tunneling oxide layer 612, a trap layer 623 coupled to the trap layer 613, and a block layer 624 coupled to the block layer 614. The length of the control gate of the first memory cell 610 is Lg1, which can also be referred to as the gate length Lg1. The gate length of the second memory cell 620 is Lg2. The distance between the control gates of the first memory cell 610 and the second memory cell 620 is Ls, which can also be referred to as the gate spacing Ls.

With the development of NAND flash memory towards device size reduction and multi-value storage technology, the gate length Lg1 of the first memory cell 610 and the gate length Lg2 of the second memory cell will be continuously reduced. Furthermore, the gate spacing Ls between the control gate of the first memory cell 610 and the control gate of the second memory cell 620 will also continue to decrease, which will exacerbate the lateral migration of charges in the first memory cell 610 and the second memory cell 620, resulting in the rapid charge loss of the first memory cell 610 and the second memory cell 620 becoming more severe.

Figure 6B:
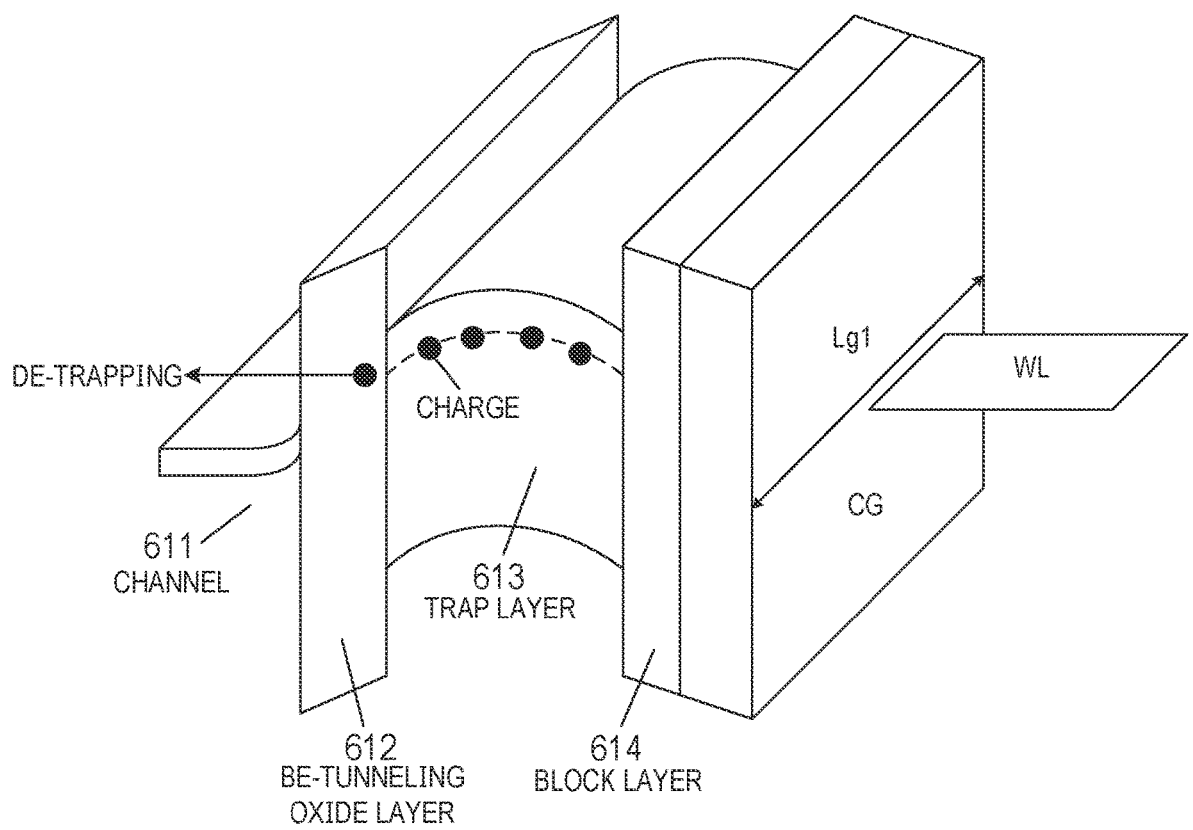

As shown in FIG. 6B, taking the first memory cell 610 as an example, as the gate length Lg1 of the first memory cell 610 decreases, and the gate spacing between the first memory cell 610 and the second memory cell 620 decreases, the electrons stored in the shallow energy level traps in the trap layer 613 after the first memory cell 610 is programmed will be released in a short period of time after the end of programming due to their low stability and return to the channel 611, which may also be referred to as de-trapping. As a result, the rapid charge loss of the first memory cell 610 becomes more severe.

The more severe rapid charge loss will cause the threshold voltage of the memory cell in the NAND flash memory to shift down as a whole after programming, and will also cause the broadening of the threshold voltage distribution curve of the memory cell in the NAND flash memory after programming, resulting in the lower reliability of the NAND flash memory.

Figure 7A:
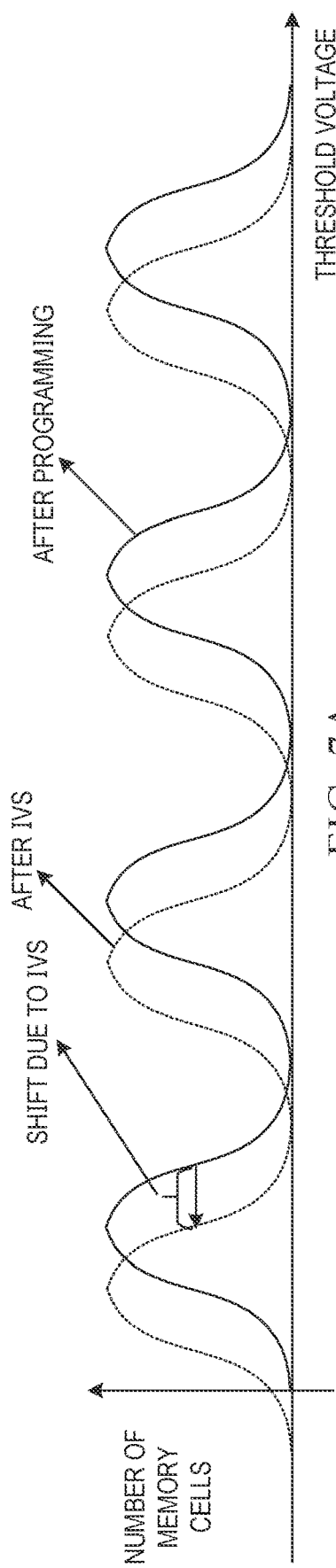
FIGS. 7A-7B are schematic diagrams of another threshold voltage distribution curve according to some implementations.
Figure 7B:
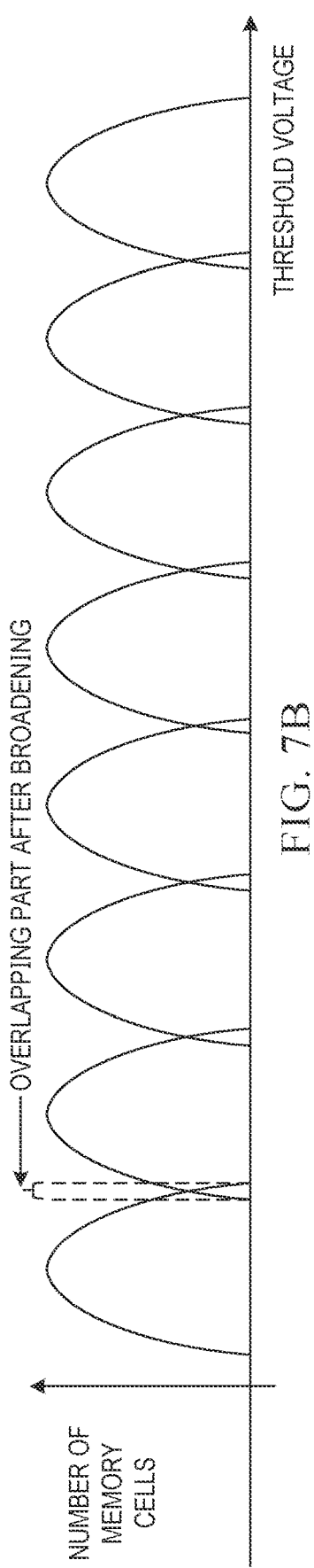

In an example, as shown in FIG. 7A, taking the NAND flash memory including multiple memory cells as an example, the curve after programming represents the threshold voltage distribution curve when the programming of the multiple memory cells is completed, and the curve after rapid charge loss (IVS) represents the threshold voltage distribution curve of the multiple memory cells after rapid charge loss. The rapid charge loss will cause the threshold voltage of the multiple memory cells to shift down as a whole after programming. Moreover, the rapid charge loss will also cause the threshold voltage distribution curves of the multiple memory cells to be broadened after programming, and overlapping parts will appear, as shown in FIG. 7B. The threshold voltage of the multiple memory cells after programming shifts down, and the threshold voltage distribution curve of the multiple memory cells after programming broadens, which will however lead to a decrease in the reliability of the multiple memory cells when reading and writing data, resulting in NAND flash memory is less reliable.

To mitigate the initial threshold voltage shift of memory cells and low reliability of NAND flash memory, an implementation of the present disclosure provides a method of operating the memory, which can improve the reliability of NAND flash memory.

Figure 8:
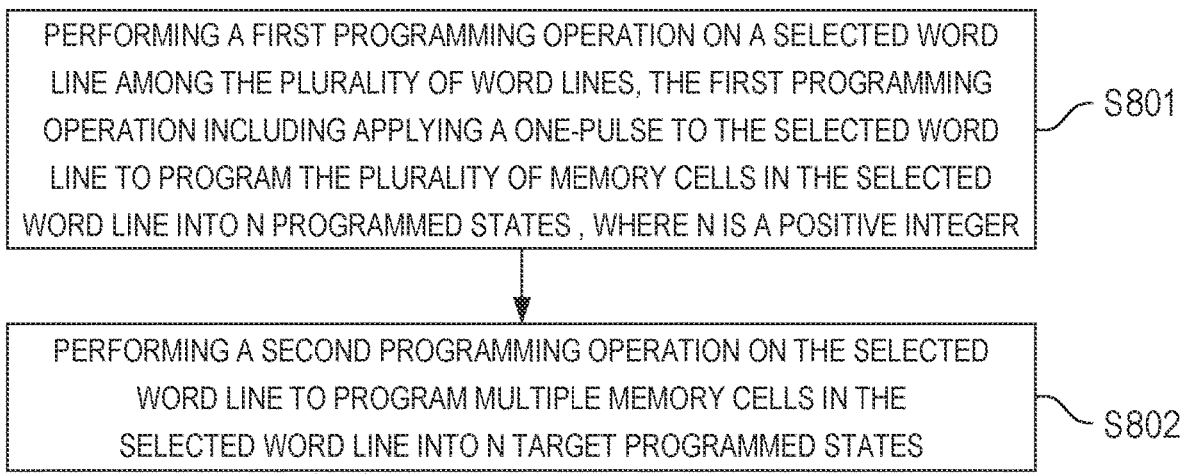
FIG. 8 is a schematic flowchart of a method of operating a memory according to some implementations.

As shown in FIG. 8, a method of operating a memory is provided in an implementation of the present disclosure, and the method includes operations S801-S802. The memory includes multiple word lines, and each word line includes multiple memory cells. Implementations of the present disclosure do not limit the specific number of word lines included in the memory, and the specific number of memory cells included in each word line. In a possible implementation, the memory may be the memory 200 as described above.

S801. Performing a first programming operation on a selected word line among the multiple word lines, the first programming operation including applying a one-pulse to the selected word line to program the multiple memory cells in the selected word line into N programmed states, where N is a positive integer.

In some examples, the selected word line may be one of the multiple word lines, or may be more than one of the multiple word lines, which is not limited in this implementation of the present disclosure.

In an example, applying a one-pulse to the selected word line includes applying multiple consecutive programming voltages to the selected word line.

In some examples, the multiple consecutive programming voltages increase sequentially, or decrease sequentially, which is not limited in this implementation of the present disclosure.

In a possible implementation, the number of the multiple consecutive programming voltages is N.

In some examples, the specific value of N is related to the type of the memory cells in the selected word line, and the implementations of the present disclosure do not limit the type of the memory cells in the selected word line and the specific value of N.

For example, when multiple memory cells in the selected word line are SLCs, the value of N is 1. When multiple memory cells in the selected word line are MLCs, the value of N is 3. When multiple memory cells in the selected word line are TLCs, the value of N is 7. When the memory cell in the selected word line is QLCs, the value of N is 15.

In a possible implementation, the memory further includes multiple bit lines, and the multiple memory cells in the selected word line are coupled to the multiple bit lines. In an example, the first programming operation includes: applying a programming voltage to the selected word line, applying a first bit line voltage to a selected bit line among the multiple bit lines, and applying a second bit line voltage to unselected bit lines among the multiple bit lines, thereby programming memory cells coupled to the selected bit line among the multiple memory cells into the same programmed state. The voltage of the first bit line is less than the voltage of the second bit line.

The first programming operation does not include a verify operation. In this way, when programming multiple memory cells in the selected word line, time can be saved and programming efficiency can be improved compared to the above-mentioned incremental step pulse programming method.

In some examples, the selected bit line may be one of the multiple bit lines, or may be more than one of the multiple bit lines, which is not limited in this implementation of the present disclosure.

In some examples, the unselected bit line may be one of the multiple bit lines, or may be more than one of the multiple bit lines, which is not limited in this implementation of the present disclosure.

The first bit line voltage is to allow the memory cells coupled to the selected bit line to be programmed, and the first bit line voltage may also be referred to as the program enable voltage. The second bit line voltage is to prohibit memory cells coupled to the unselected bit line to be programmed, and the second bit line voltage may also be referred to as a program inhibit voltage.

Figure 9:
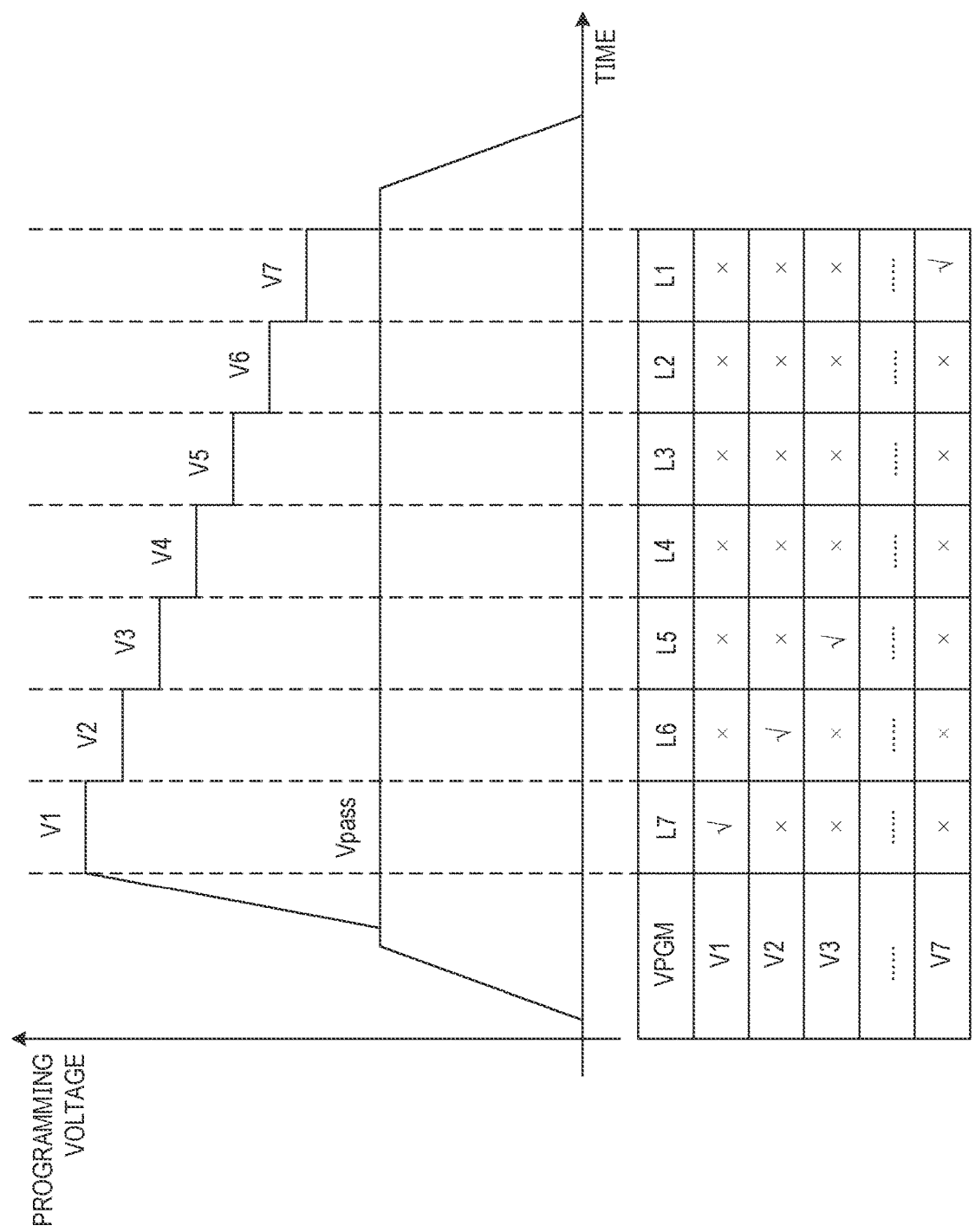
FIG. 9 is another schematic diagram illustrating the change in the voltage applied to a memory cell according to some implementations.

In an example, as shown in FIG. 9, multiple memory cells in the selected word line are TLCs, the value of N is 7, the first programming operation programs the multiple memory cells in the selected word line into seven programmed states of L1-L7, multiple consecutive programming voltages applied to the selected word line are sequentially reduced, the multiple programming voltages are all greater than the turn-on voltage Vpass, the memory includes the first bit line to the seventh bit line, and the selected bit line in each pulse cycle is one of the 7 bit lines.

Figure 10A:
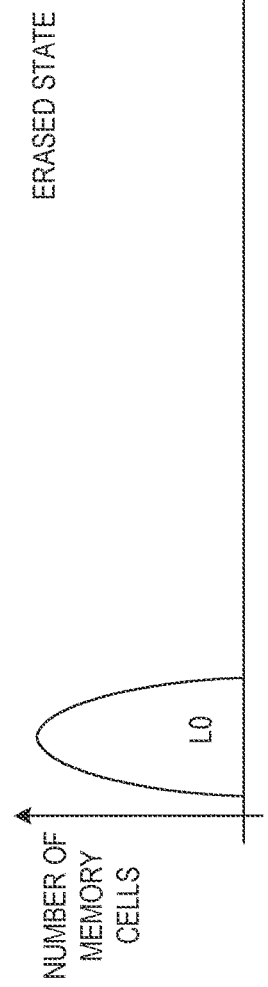
FIGS. 10A-10C are schematic diagrams of another threshold voltage distribution curve according to some implementations.

Before programming the multiple memory cells in the selected word line, the multiple memory cells are in the erased state L0, and the threshold voltage distribution curves of the multiple memory cells are shown in FIG. 10A.

In the first pulse cycle, the selected bit line may be the first bit line, the unselected bit lines may be the second bit line to the seventh bit line, the first programming voltage V1 may be applied to the selected word line, and the first bit line voltage may be applied to the first bit line, and the second bit line voltage may be applied to the second bit line to the seventh bit line, so as to program the memory cells coupled to the first bit line to the same programmed state L7. In FIG. 9, "√" indicates that the first bit line voltage is applied, and "X" indicates that the second bit line voltage is applied.

In the second pulse cycle, the selected bit line may be the second bit line, the unselected bit lines may be the first bit line and the third bit line to the seventh bit line, the second programming voltage V2 may be applied to the selected word line, the first bit line voltage may be applied to the second bit line, and the second bit line voltage may be applied to the first bit line and the third bit line to the seventh bit line, thereby programming the memory cells coupled to the second bit line into the same programmed state L6.

From the third pulse cycle to the sixth pulse cycle, the third programming voltage V3 to the sixth programming voltage V6 which are sequentially decreased may be applied to the selected word line, and the first bit line voltage is sequentially applied to the selected third bit line to sixth bit line, so that the memory cells coupled to the third bit line to the sixth bit line are respectively programmed into the programmed states L5-L2. The specific process may refer to the description of the first pulse cycle and the second pulse cycle above, and will not be described in the implementations of the present disclosure.

Figure 10B:
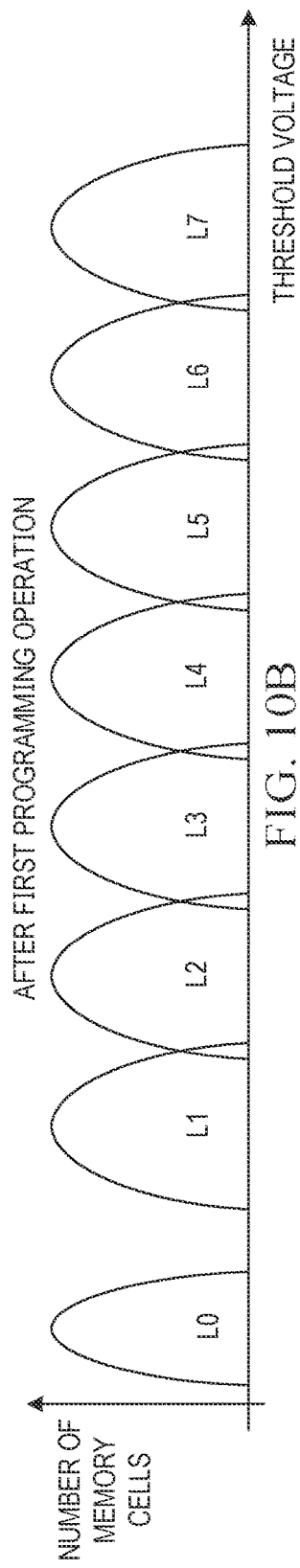

In the seventh pulse cycle, the selected bit line may be the seventh bit line, the unselected bit lines may be the first bit line to the sixth bit line, the seventh programming voltage V7 may be applied to the selected word line, and the first bit line voltage may be applied to the seventh bit line, and the second bit line voltage may be applied to the first bit line to the sixth bit line, so as to program the memory cells coupled to the seventh bit line into the same programmed state L1. Due to the rapid charge loss, the threshold voltages of the multiple memory cells in the selected word line shift down as a whole after programming, the threshold voltage distribution curves of the multiple memory cells broaden, and the threshold voltage distribution curves of the multiple memory cells after the first programming operation is shown in FIG. 10B.

Through the seven pulse cycles, the memory cells coupled to the first bit line to the seventh bit line can be respectively programmed into the programmed states L1-L7, and there is no verify operation during the programming process, thereby saving programming time and improving programming efficiency.

Figure 11:
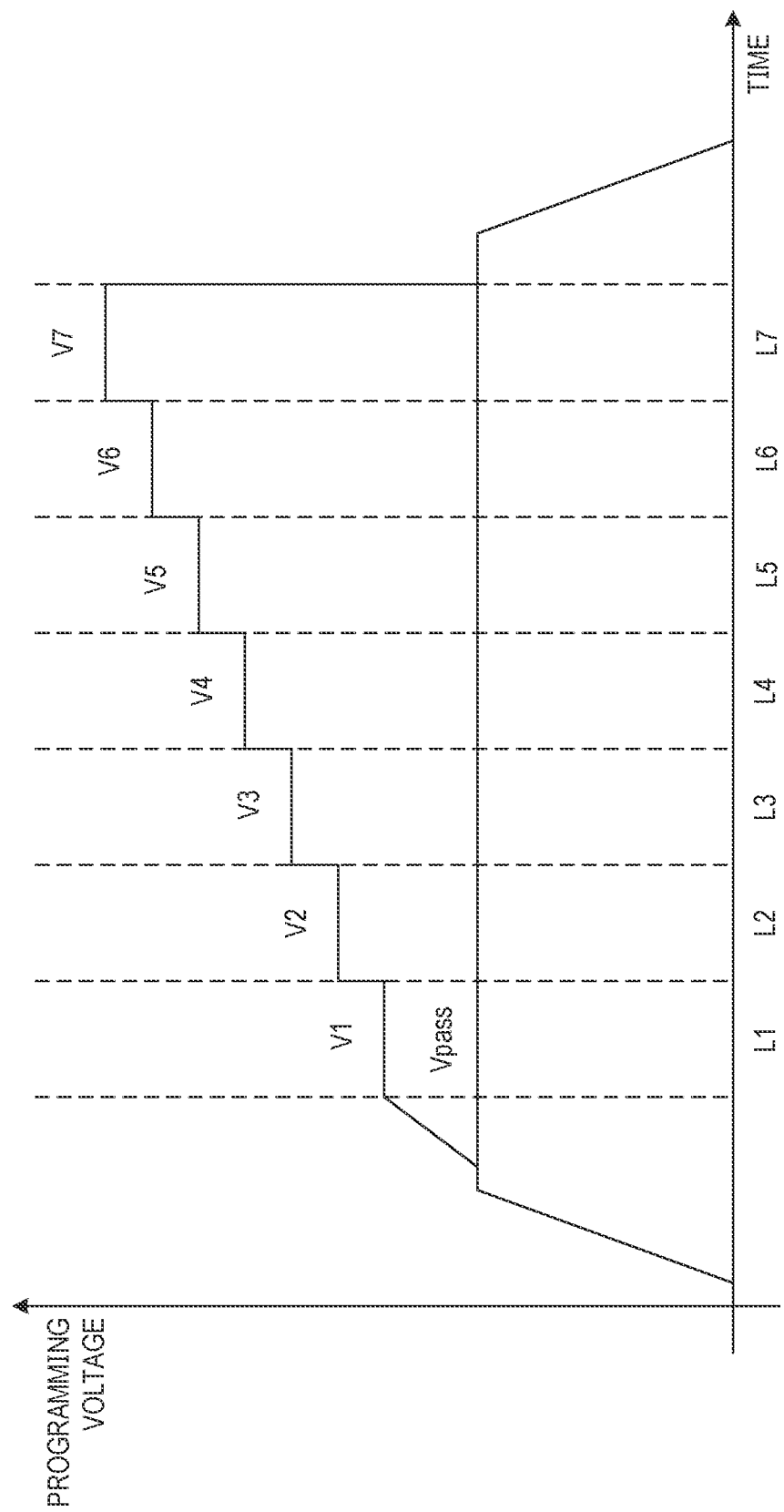
FIG. 11 is yet another schematic diagram illustrating the change in the voltage applied to memory cells according to some implementations.

In another example, as shown in FIG. 11, multiple memory cells in the selected word line are TLCs, the value of N is 7, the first programming operation programs the multiple memory cells in the selected word line into seven programmed states of L1-L7, multiple consecutive programming voltages applied to the selected word line are sequentially increased, the multiple programming voltages are all greater than the turn-on voltage Vpass, the memory includes the first bit line to the seventh bit line, and the selected bit lines in each pulse cycle are more than one of the 7 bit lines.

Before programming the multiple memory cells in the selected word line, the multiple memory cells are in the erased state L0, and the threshold voltage distribution curves of the multiple memory cells are shown in FIG. 10A.

In the first pulse cycle, the selected bit line may be the first bit line to the seventh bit line, the first programming voltage V1 may be applied to the selected word line, and the first bit line voltage may be applied to the first bit line to the seventh bit line, thereby programming the memory cells coupled to the first bit line to the seventh bit line into the same programmed state L1.

In the second pulse cycle, the selected bit line may be the second bit line to the seventh bit line, the unselected bit line may be the first bit line, the second programming voltage V2 may be applied to the selected word line, the first bit line voltage may be applied to second bit line to the seventh bit line, the second bit line voltage may be applied to the first bit line, thereby programming the memory cells coupled to the second bit line to the seventh bit line into the same programmed state L2, and the memory cells coupled to the first bit line will keep the first programmed state L1.

From the third pulse cycle to the sixth pulse cycle, third programming voltage V3 to sixth programming voltage V6 sequentially increased may be applied to the selected word line, and the number of selected bit lines in each pulse cycle is sequentially reduced, so as to be program the memory cells coupled to the third bit line to the sixth bit line into programmed states L3-L6, respectively. The specific process can refer to the description of the first pulse cycle and the second pulse cycle above, and will not be repeated in the implementations of the present disclosure.

In the seventh pulse cycle, the selected bit line may be the seventh bit line, the unselected bit line may be the first bit line to the sixth bit line, the seventh programming voltage V7 may be applied to the selected word line, the first bit line voltage may be applied to the seventh bit line, and the second bit line voltage may be applied to the first bit line to the sixth bit line, thereby programming the memory cells coupled to the seventh bit line into the same programmed state L7, and the memory cells coupled to the remaining bit lines will keep their respective programmed states. Due to the rapid charge loss, the threshold voltages of the multiple memory cells in the selected word line shift down as a whole after programming, the threshold voltage distribution curves of the multiple memory cells broaden, and the threshold voltage distribution curves of the multiple memory cells after the first programming operation are shown in FIG. 10B.

Through the seven pulse cycles, the memory cells coupled to the first bit line to the seventh bit line may be respectively programmed into the programmed states L1-L7, and there is no verify operation during the programming process, so that programming time can be saved and programming efficiency can be improved.

S802. Performing a second programming operation on the selected word line to program multiple memory cells in the selected word line into N target programmed states.

In a possible implementation, the N target programmed states may be predetermined according to the types of the multiple memory cells.

In an example, when the multiple memory cells are TLCs, seven target programmed states of the multiple memory cells may be determined by means of simulation or experiment and so on, before programming the multiple memory cells.

In an example, performing the second programming operation on the selected word line includes: performing the second programming operation on multiple memory cells in the selected word line by adopting an incremental step pulse programming method.

Figure 10C:
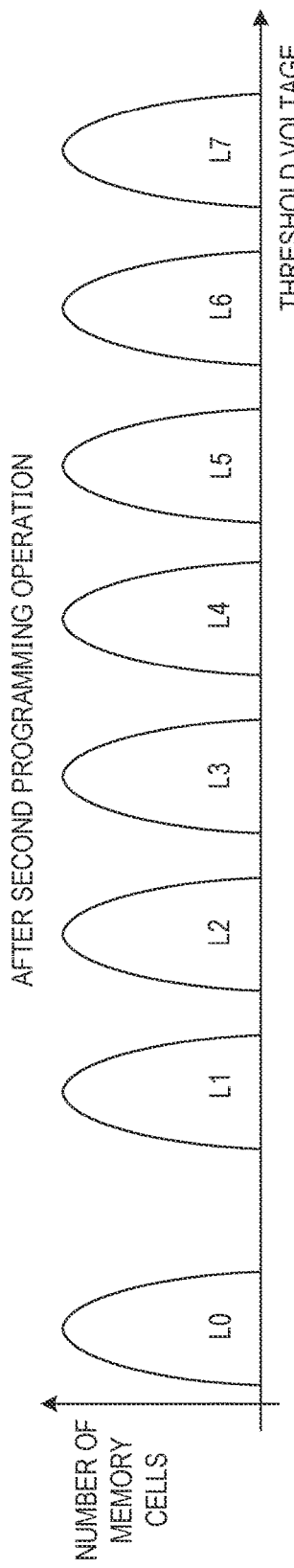

In an example, the multiple memory cells in the selected word line are TLCs, the value of N is 7, and after the first programming operation is performed on the multiple memory cells in the selected word line, the threshold voltage distribution curve is shown in FIG. 10B. For multiple memory cells programmed into the same programmed state L1 after the first programming operation, the incremental step pulse programming method shown in FIG. 4 can be used to program to the target programmed state L1 shown in FIG. 10C. Multiple memory cells in other programmed states can also adopt this method to program multiple memory cells in the selected word line into seven target programmed states. At this time, the threshold voltage distribution curves of the multiple memory cells after the first programming operation are shown in FIG. 10C. For the process, reference may be made to the relevant description of FIG. 4 above and the relevant description of incremental step pulse programming in the prior art, and it will not be repeated in the implementations of the present disclosure.

The second programming operation includes a verify operation. By performing the second programming operation on the selected word line, the multiple memory cells in the selected word line are reprogrammed and verified, so that the memory cells in the selected word line may be more accurately programmed into the target programmed states. The challenge that the threshold voltage of multiple memory cells in the selected word line shifts down as a whole due to rapid charge loss and the challenge that the threshold voltage distribution curves of the multiple memory cells broaden may be mitigated, thereby improving the reliability of NAND flash memory.

In a possible implementation, the threshold voltage distribution range of the memory cell in the Nth programmed state after the first programming operation is greater than that of the memory cell in the Nth programmed state after the second programming operation.

For example, the threshold voltage distribution range of memory cells in the first programmed state L1 after the first programming operation is shown in FIG. 10B, and the threshold voltage distribution range of memory cells in the first programmed state L1 after the second programming operation is shown in FIG. 10C. The threshold voltage distribution range of the memory cells in the first programmed state L1 after the first programming operation is greater than that of the memory cells in the first programmed state L1 after the second programming operation. Performing the second programming operation after the first programming operation mitigates the challenge that the threshold voltages of multiple memory cells in the selected word line shift down due to rapid charge loss, and the challenge that the threshold voltage distribution curves of the multiple memory cells broaden.

In a possible implementation, when M memory cells among the K memory cells reach the target programmed state after the second programming operation, it can be determined that the K memory cells are programmed into the target programmed state, and the K memory cells are memory cells programmed into the same programmed state after the first programming operation, where both M and K are positive integers, and M is less than or equal to K. The specific values of K and M are not limited in the implementations of the present disclosure.

In an example, the value of K is 1000, the value of M is 900, and 1000 memory cells are programmed into the same programmed state after the first programming operation. When 900 memory cells among the 1000 memory cells reach the target programmed state after the second programming operation, it can be determined that the programming of the 1000 memory cells is successful without having to constantly perform the second programming operation until the 1000 memory cells are programmed into the target programmed state, thereby saving programming time and improving programming efficiency.

In the method of operating a memory according to an implementation of the present disclosure, a first programming operation is firstly performed on a selected word line among multiple word lines, and the first programming operation includes applying a one-pulse to the selected word line to program the multiple memory cells in selected word line into N programmed states. Then, the second programming operation is performed on the selected word line, and the multiple memory cells in the selected word line are programmed into N target programmed states, so that the challenges can be solved that the threshold voltages of the multiple memory cells in the selected word line shift down as a whole due to rapid charge loss and the threshold voltage distribution curves of the multiple memory cells broaden. The reliability of the NAND flash memory can be improved. Moreover, the first programming operation does not include a verify operation, and when programming multiple memory cells in the selected word line, time can be saved and programming efficiency can be improved compared to the above-mentioned incremental step pulse programming method.

An implementation of the present disclosure further provides a memory, the memory includes a peripheral circuit, and a memory array coupled to the peripheral circuit. The memory array includes multiple word lines, and each word line includes multiple memory cells. In a possible implementation, the structure of the memory may be the same as the structure of the memory 200 as shown in FIG. 2.

The peripheral circuit is configured to perform a first programming operation on a selected word line among the multiple word lines. The first programming operation includes applying a one-pulse to the selected word line to program multiple memory cells in the selected word line into N programmed states. The peripheral circuit is further configured to perform a second programming operation on the selected word line to program the multiple memory cells in the selected word line into N target programmed states, where N is a positive integer.

In some examples, the selected word line may be one of the multiple word lines, or may be more than one of the multiple word lines, which is not limited in this implementation of the present disclosure.

In a possible implementation, the peripheral circuit is configured to apply multiple consecutive programming voltages to the selected word line.

In some examples, the multiple consecutive programming voltages increase sequentially, or decrease sequentially, which is not limited in this implementation of the present disclosure.

In a possible implementation, the number of the multiple consecutive programming voltages is N.

In some examples, the specific value of N is related to the type of the memory cell in the selected word line, and the implementation of the present disclosure does not limit the type of the memory cell in the selected word line, nor does it limit the specific value of N.

In a possible implementation, the memory further includes multiple bit lines, and the multiple memory cells in the selected word line are coupled to the multiple bit lines. In an example, when performing the first programming operation, the peripheral circuit is configured to apply the programming voltage to the selected word line, apply the first bit line voltage to the selected bit line among the multiple bit lines, and apply the second bit line voltage to the unselected bit line among the multiple bit lines, thereby programming the memory cells coupled to the selected bit line among the multiple memory cells into the same programmed state. The first bit line voltage is lower than the second bit line voltage.

The first programming operation does not include a verify operation, so that when programming multiple memory cells in the selected word line, time can be saved and programming efficiency can be improved compared to the above-mentioned incremental step pulse programming method.

In some examples, the selected bit line may be one of the multiple bit lines, or may be more than one of the multiple bit lines, which is not limited in this implementation of the present disclosure.

In some examples, the unselected bit line may be one of the multiple bit lines, or may be more than one of the multiple bit lines, which is not limited in this implementation of the present disclosure.

In a possible implementation, the above N target programmed states may be predetermined according to the types of the multiple memory cells.

In a possible implementation, the peripheral circuit is configured to perform the second programming operation on the multiple memory cells in the selected word line in an incremental step pulse programming manner. The second programming operation includes a verify operation. By performing the second programming operation on the selected word line, programming and verification are performed on multiple memory cells in the selected word line again. The challenge that the threshold voltages of multiple memory cells in the selected word line shift down as a whole due to fast charge loss and the challenge that the threshold voltage distribution curves of the multiple memory cells broaden can be solved, so that the reliability of the NAND flash memory can be improved.

In a possible implementation, the threshold voltage distribution range of the memory cell in the Nth programmed state after the first programming operation is greater than that of the memory cell in the Nth programmed state after the second programming operation.

In the memory provided by the implementations of the present disclosure, the peripheral circuit first performs a first programming operation on a selected word line among multiple word lines, and the first programming operation includes applying a one-pulse to the selected word line to program the multiple memory cells in the selected word line into N programmed states. Then, the peripheral circuit performs the second programming operation on the selected word line to program the multiple memory cells in the selected word line into N target programmed states, thereby solving the challenge that the threshold value of the multiple memory cells in the selected word line shifts down as a whole due to rapid charge loss and the challenge that the threshold voltage distribution curves of the multiple memory cells broaden, so as to improve the reliability of the NAND flash memory. Moreover, the first programming operation does not include a verify operation, and when programming multiple memory cells in the selected word line, time can be saved and programming efficiency can be improved compared to the above-mentioned incremental step pulse programming method.

An implementation of the present disclosure further provides a memory system. The memory system includes a controller and at least one memory coupled to the controller. The controller is configured to control reading and writing of the memory. The memory is the memory provided by the above-mentioned implementations of the present disclosure. The structure of the memory may be that of the memory 200 shown in FIG. 2, and the structure of the memory system may be that of the memory system 100 shown in FIG. 1 in the foregoing example.

The implementation of the present disclosure further provides an electronic device. The electronic device includes a processor, and a memory system coupled with the processor. The memory system is the memory system provided by the above-mentioned implementations of the present disclosure. The structure of the memory system may be that of the memory system 100 as shown in FIG. 1. The structure of the electronic device may be that of the electronic device 10 as shown in FIG. 1.

The relevant descriptions about the method of operating the memory in the foregoing implementations can be referenced correspondingly to the implementations of the memory, the memory system, and the electronic device, and will not be repeated in the implementations of the present disclosure.

The foregoing is merely a detailed description of the present disclosure. However, the protection scope of the present disclosure is not limited thereto, and any changes or substitutions within the technical scope disclosed in the present disclosure shall be covered within the protection scope of the present disclosure. Therefore, the protection scope of the present disclosure should be determined by the protection scope of the claims.

What is claimed is:

1. A method of operating a memory, wherein the memory comprises a plurality of word lines, each of the plurality of the word lines coupled to a plurality of memory cells, and the method comprises:

performing a first programming operation on a plurality of memory cells coupled to a selected word line of the plurality of word lines, the first programming operation comprising applying a one-pulse to the selected word line to program a plurality of memory cells coupled to the selected word line into N programmed states by applying a plurality of consecutively increasing or consecutively decreasing programming voltages to the selected word line, wherein the first programming operation does not include a verify operation; and performing a second programming operation on the selected word line to program the plurality of memory cells coupled to the selected word line into N target programmed states, where N is a positive integer.

2. The method according to claim 1, wherein the plurality of consecutively increasing programming voltages increase sequentially, and wherein the plurality of consecutively decreasing programming voltages decrease sequentially.

3. The method according to claim 2, wherein a number of the plurality of consecutive programming voltages is N.

4. The method according to claim 3, wherein the memory further comprises a plurality of bit lines, and the first programming operation comprises:

applying a programming voltage to the selected word line, applying a first bit line voltage to a selected bit line among the plurality of bit lines, and applying a second bit line voltage to unselected bit lines among the plurality of bit lines, thereby programming a memory cell coupled to the selected bit line among the plurality of memory cells into the same programmed state, the first bit line voltage being lower than second bit line voltage.

5. The method according to claim 1, wherein the performing a second programming operation on the selected word line comprises:

performing the second programming operation on the plurality of memory cells in the selected word line by using an incremental step pulse programming (ISPP) method.

6. The method according to claim 5, wherein the second programming operation comprises a verify operation.

7. The method according to claim 6, wherein memory cell in an $N^{th}$ programmed state after the first programming operation belongs to a threshold voltage distribution rangeis greater than that of the memory cell in the $N^{th}$ programmed state after the second programming operation.

8. A memory comprising:
a peripheral circuit, and
a memory array coupled with the peripheral circuit, the memory array comprising a plurality of word lines, each of the plurality of the word lines coupled to a plurality of memory cells,
wherein the peripheral circuit is configured to:
perform a first programming operation on a plurality of memory cells coupled to a selected word line of the plurality of word lines, the first programming operation comprising applying a one-pulse to the selected word line to program a plurality of memory cells coupled to the selected word line into N programmed states by applying a plurality of consecutively increasing or consecutively decreasing programming voltages to the selected word line, wherein the first programming operation does not include a verify operation; and
perform a second programming operation on the selected word line to program the plurality of memory cells coupled to the selected word line into N target programmed states, where N is a positive integer.

9. The memory according to claim 8, wherein the plurality of consecutively increasing programming voltages increase sequentially, and wherein the plurality of consecutively decreasing programming voltages decrease sequentially.

10. The memory according to claim 9, wherein a number of the plurality of consecutive programming voltages is N.

11. The memory according to claim 10, wherein the memory array further comprises a plurality of bit lines; and
the peripheral circuit is configured to apply a programming voltage to the selected word line, apply a first bit line voltage to a selected bit line among the plurality of bit lines, and apply a second bit line voltage to unselected bit lines among the plurality of bit lines, thereby programming a memory cell coupled to the selected bit line among the plurality of memory cells into the same programmed state, the first bit line voltage being lower than second bit line voltage.

12. The memory according to claim 8, wherein
the peripheral circuit is configured to perform the second programming operation on the plurality of memory cells in the selected word line by using an incremental step pulse programming ISPP method.

13. The memory according to claim 12, wherein the second programming operation comprises a verify operation.

14. The memory according to claim 13, wherein a memory cell in an $N^{th}$ programmed state after the first programming operation belongs to a threshold voltage distribution range greater than that of the memory cell in the $N^{th}$ programmed state after the second programming operation.

15. A memory system comprising:
a controller; and
at least one memory coupled to the controller,
wherein the controller is configured to control reading and writing of the memory and the memory comprises:
a peripheral circuit, and
a memory array coupled with the peripheral circuit, the memory array comprising a plurality of word lines, each of the plurality of the word line coupled to a plurality of memory cells, and
wherein the peripheral circuit is configured to:
perform a first programming operation on a plurality of memory cells coupled to a selected word line of the plurality of word lines, the first programming operation comprising applying a one-pulse to the selected word line to program a plurality of memory cells coupled to the selected word line into N programmed states by applying a plurality of consecutively increasing or consecutively decreasing programming voltages to the selected word line, wherein the first programming operation does not include a verify operation; and
perform a second programming operation on the selected word line to program the plurality of memory cells coupled to the selected word line into N target programmed states, where N is a positive integer.

16. The memory system of claim 15, wherein the plurality of consecutively increasing programming voltages increase sequentially, and wherein the plurality of consecutively decreasing programming voltages decrease sequentially.

17. The memory system of claim 16, wherein a number of the plurality of consecutive programming voltages is N.

18. The memory system of claim 17, wherein the memory array further comprises a plurality of bit lines, and the first programming operation comprises:

applying a programming voltage to the selected word line, applying a first bit line voltage to a selected bit line among the plurality of bit lines, and applying a second bit line voltage to unselected bit lines among the plurality of bit lines, thereby programming a memory cell coupled to the selected bit line among the plurality of memory cells into the same programmed state, the first bit line voltage being lower than second bit line voltage.

19. The memory system of claim 15, wherein performing a second programming operation on the selected word line comprises:

performing the second programming operation on the plurality of memory cells in the selected word line by using an incremental step pulse programming (ISPP) method.

20. The memory system of claim 15, wherein the second programming operation comprises a verify operation, and wherein a memory cell in an $N^{th}$ programmed state after the first programming operation belongs to a threshold voltage distribution range greater than that of the memory cell in the $N^{th}$ programmed state after the second programming operation.

* * * * *